United States Patent

Pahl et al.

[11] Patent Number: 5,924,793
[45] Date of Patent: Jul. 20, 1999

[54] LIGHT ILLUMINATION SYSTEM

[76] Inventors: Richard C. Pahl, 436 Date Palm Ct., St. Petersburg, Fla. 33703; Allan D. Mayer, 8459 121st Place North, Largo, Fla. 33733

[21] Appl. No.: 08/749,986

[22] Filed: Nov. 15, 1996

[51] Int. Cl.⁶ ........................................ F21V 8/00
[52] U.S. Cl. ..................... 362/581; 362/566; 362/551; 362/582; 362/190; 362/194
[58] Field of Search .................................... 362/194, 253, 362/190, 191, 551, 565, 566, 581, 582

[56] References Cited

U.S. PATENT DOCUMENTS

| | | | |
|---|---|---|---|
| 2,473,981 | 6/1949 | Wood | 240/8.1 |
| 4,453,201 | 6/1984 | Prouty | 362/121 |
| 4,715,564 | 12/1987 | Kinn | 244/153 |
| 4,942,506 | 7/1990 | Flory | 362/253 |
| 5,000,402 | 3/1991 | Blackburn | 244/153 |
| 5,098,039 | 3/1992 | Linden | 244/153 |
| 5,363,470 | 11/1994 | Wortman | 385/147 |
| 5,537,297 | 7/1996 | Ghandehari | 362/32 |
| 5,564,816 | 10/1996 | Arcadia | 362/183 |

*Primary Examiner*—Sandra O'Shea
*Assistant Examiner*—Marshall Honeyman

[57] ABSTRACT

A light illumination fixture comprising compact battery powered apparatus with a single light source that illuminates an optical medium which is in the form of an elongated tubular shaped semitransparent material, where the tubular shaped semitransparent material to be illuminated may be applied to the exterior of an object or the material itself may be shaped to form support structure of an object. The light source is contained within a chamber in the fixture and requires a low powered battery light source. A slideable cover together with a battery actuation contact means forms a switch to actuate the light source. A plurality of openings extending from the light chamber receive the light transmitting elongated tubular shaped semitransparent material. The light illumination fixture together with the tubular light transmitting material can be used to form a decorative display object such as a cross or can be used to illuminate and object such as a kite. When the light source is actuated, the light is directed through the tubular material and is visible in dim light or at night for some distance.

5 Claims, 4 Drawing Sheets

LIGHT ILLUMINATION SYSTEM

BACKGROUND

The invention relates generally to a lighting apparatus for illuminating objects in dim light or at night and, more particularly, to a compact battery powered apparatus with a single light source that illuminates an optical medium which is in the form of an elongated tubular shaped semitransparent material, where the tubular shaped semitransparent material to be illuminated may be applied to the exterior of an object or the material itself may be shaped to form support structure of an object.

Attention is called to U.S. Pat. Nos. 2,473,981; 4,942,506; 5,000,402; and 5,098,039.

It is common to attach a light or lights to an object to illuminate the object in dim light or at night. In particular, there is a need to illuminate objects in dim light or at night from a battery powered light source when electric power is not available or inconvenient. An example of such an object that benefits from illumination in dim light or at night is a kite or alternatively, a decorative object such as a cross for holiday or floral display. In either case, the light to be provided must be visible from some distance, yet the power required must be low, or else the battery has to be continually replaced. In addition, the illuminating apparatus must be lightweight, especially for a kite or for insertion of an illuminated display in a floral arrangement. To keep the apparatus lightweight, a small, single battery is desirable. There is a need for a switch device to easily turn off and conserve battery power when illumination is not desired. It is also desirable that the illumination or reflecting means be part of the structure of the apparatus, so as to keep it lightweight. It is also desirable that the apparatus be low cost and easy to manufacture and assemble. To keep the apparatus low cost and low powered so as to extend the battery life, a low power single light source is needed. Yet that light bulb must give sufficient light to illuminate the object so that the object is visible from some distance. In order to comply with safety guidelines, it is desirable that the device have few electrical wires and connections and that any electrical wires and connections be safely enclosed. In the case of the illumination of a decorative display, there is also the need to guard against possible fire. In the case of the illumination of a kite, it is necessary to guard against shorting out electrical wires if the kite encounters electrical power wires. In both cases, it is desirable to comply with United States Consumer Product Safety Commission Standards.

For the foregoing reasons, there is a need, therefore for an illuminating apparatus that is low powered, lightweight, in which the illumination system can form part of the support structure of the device, has a simple, easy to use, low cost switch to turn battery power on and off, is low cost and easily and inexpensively fabricated and assembled, and has few electrical wires and connections, with any such electrical wires and connections being safely enclosed.

SUMMARY

The present invention is directed to a device that satisfies these needs. The present invention provides for an illuminating apparatus that is low powered, lightweight, in which the illumination system forms part of the support structure of the device, has a simple, easy to use, low cost switch to turn battery power on and off, is low cost and easily and inexpensively fabricated and assembled, and has few electrical wires and connections, with any such electrical wires and connections being safely enclosed.

A device having features of the present invention comprises a light illumination fixture with a bracket having an opening that is sufficiently large to hold a commercially available battery and contacts for holding a battery. A battery actuation contact means is disposed within the battery opening. A light source is disposed within a chamber in the bracket and is connected to the battery. A plurality of openings extend from the chamber and can receive a light transmitting material which is to be illuminated by the light source.

In an alternate embodiment of the invention, a removable slideable cover fits over the battery opening within the bracket, and together with activators disposed on the inside of the slideable switch, forms a switch that allows the battery power to be turned on or off. When the slideable cover is centered over the battery opening and a battery is inserted, the slideable cover allows the battery actuation contact means to contact the battery and for power to flow from the battery to the light source. When the slideable cover is not centered over the battery opening, the battery actuation contact means is not in contact with the battery and the light source is turned off.

In an alternative embodiment of the invention, a light transmitting material, in the form of a semitransparent material in an elongated tubular shape, is inserted in the plurality of openings extending from the chamber. The light transmitting material forms part of the support structure of the object to be illuminated. In an alternative embodiment of the invention, the semitransparent material in an elongated tubular shape has a hollow passageway. In an alternative embodiment of the invention, the size of the openings extending from the chamber for receiving a light transmitting material are proportional to the length of the semitransparent material in an elongated tubular shape, to allow the light emitted from the light source to be distributed along the length of the semitransparent material.

In an alternative embodiment of the invention, a light transmitting material, in the form of a semitransparent material in an elongated tubular shape with a hollow passageway, is inserted in the plurality of openings extending from the chamber and the light transmitting material is applied to the exterior of the object to be illuminated.

In an alternative embodiment of the invention, the light transmitting material, in the form of a semitransparent material in an elongated tubular shape inserted into the openings in the chamber, forms the support structure of the arms of a kite.

In an alternative embodiment of the invention, the light transmitting material, in the form of a semitransparent material in an elongated tubular shape inserted into the openings in the chamber, forms the support structure of the arms of a cross.

A device having features of the present invention comprises a kite light illumination system with a bracket having an opening that is sufficiently large to hold a commercially available battery and contacts for holding a battery. A battery actuation contact means is disposed within the battery opening. A light source is disposed within a chamber in the bracket and is connected to the battery. A plurality of openings extend from the chamber and can receive a light transmitting material which is to be illuminated by the light source. A light transmitting material, in the form of a semitransparent material in an elongated tubular shape with a hollow passageway, is inserted in the plurality of openings extending from the chamber. The light transmitting material forms the support structure of the arms of a kite.

In an alternative embodiment of the kite illumination system, the light transmitting material, inserted into the plurality of openings extending from the chamber, is in the form of four substantially rigid, elongated tubular shaped support members where the first support member forms the upper central strut of the kite arm and is inserted into an opening in the first surface of the bracket. The second support member forms the lower central strut of the kite arm and is inserted into an opening in the second surface of the bracket, directly opposite to the opening in the first surface of the bracket. The third and fourth support members form a strut that bisects the first and second support members. The third support member is inserted into a third opening in a third surface of the bracket, which is at a ninety degree angle to the first opening, and a fourth member is inserted into a fourth opening in a fourth surface of the bracket, which is at a one hundred and eighty degree angle from the third opening.

In an alternative embodiment of the kite illumination system, a removable slideable cover fits over the battery opening within the bracket and forms a switch that allows the battery power to be turned on or off. When the slideable cover is centered over the battery opening and a battery is inserted, the slideable cover allows the battery actuation contact means to contact the battery and for power to flow from the battery to the light source. When the slideable cover is not centered over the battery opening, the battery actuation contact means is not in contact with the battery and the light source is turned off.

In an alternative embodiment of the kite illumination system, the battery and light source are connected in such a way so that there are no exposed wires.

A device having features of the present invention comprises a cross illumination system with a bracket having an opening that is sufficiently large to hold a commercially available battery and contacts for holding a battery. A battery actuation contact means is disposed within the battery opening. A light source is disposed within a chamber in the bracket and is connected to the battery. A plurality of openings extend from the chamber and can receive a light transmitting material which is to be illuminated by the light source. A light transmitting material in the form of a semitransparent material in an elongated tubular shape with a hollow passageway is inserted in the plurality of openings extending from the chamber. The light transmitting material forms the support structure of the arms of a kite.

In an alternative embodiment of the cross illumination system, the light transmitting material inserted into the plurality of openings extending from the chamber is in the form of four substantially rigid, elongated tubular shaped support members where the first support member forms the upper central strut of the cross and is inserted into an opening in the first surface of the bracket. The second support member forms the lower central strut of the cross and is inserted into an opening in the second surface of the bracket, directly opposite to the opening in the first surface of the bracket. The third and fourth support members form a strut that bisects the first and second support members. The third support member is inserted into a third opening in a third surface of the bracket, which is at a ninety degree angle to the first opening, and a fourth member is inserted into a fourth opening in a fourth surface of the bracket, which is at a one hundred and eighty degree angle from the third opening.

In an alternative embodiment of the cross illumination system, a removable slideable cover fits over the battery opening within the bracket and forms a switch that allows the battery power to be turned on or off. When the slideable cover is centered over the battery opening and a battery is inserted, the slideable cover allows the battery actuation contact means to contact the battery and for power to flow from the battery to the light source. When the slideable cover is not centered over the battery opening, the battery actuation contact means is not in contact with the battery and the light source is turned off.

In an alternative embodiment of the cross illumination system, the battery and light source are connected in such a way so that there are no exposed wires.

In each of the embodiments of the light illumination fixture, the kite illumination system and the decorative cross illumination system, the semitransparent material that is inserted into the opening in the chamber acts as an optical medium that allows light from the light source to extend through the semitransparent material.

In alternative embodiments of the light illumination fixture, the kite illumination system and the decorative cross illumination system, the light transmitting material is an acrylic transparent or semitransparent optical medium.

In alternative embodiments of the light illumination fixture, the kite illumination system and the decorative cross illumination system, the light transmitting material is a neon optical medium.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
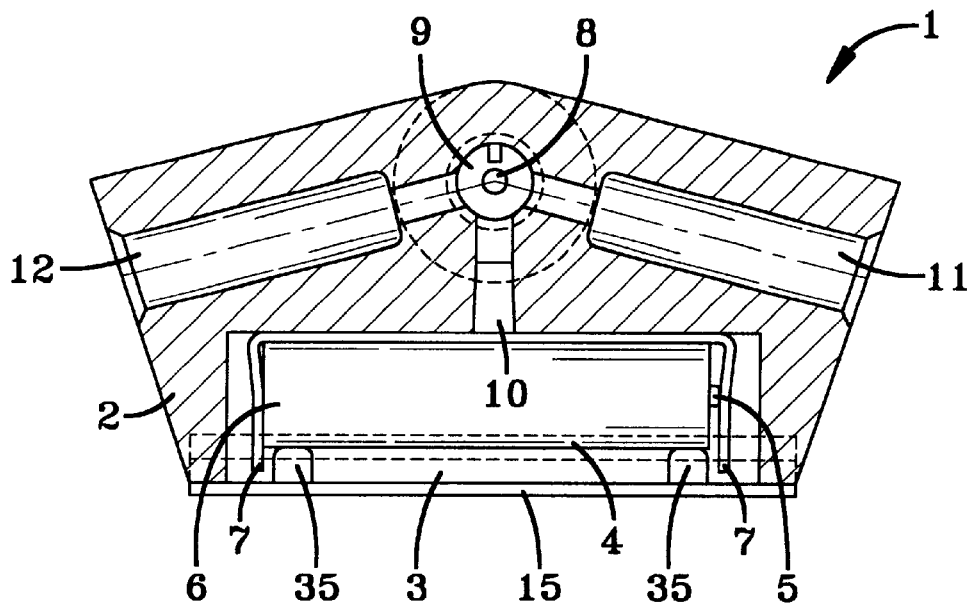
FIG. 1 shows a longitudinal sectional view of a preferred embodiment of the light illumination fixture, embodying features of the present invention.

Turning now to FIG. 1, a preferred embodiment of the light illuminating fixture 1, is shown in accordance with the present inventive concepts. The light illuminating fixture 1 comprises a bracket 2 containing an opening 3 for a battery 4 with positive and negative contacts 5 and 6 and a battery actuation contact means 7 disposed within the battery opening 3. A light source 8 is disposed within a chamber 9 in the bracket 2 and is connected to the battery contacts through an opening 10 extending from the chamber 9 to the battery opening 3. A plurality of openings 11 and 12 extend from the chamber 9 for receiving a light transmitting material to be illuminated by the light source 8. A slideable cover 15 is disposed over the battery opening 3 on the bracket 2 and activator contacts 35 on the inside surface of the slideable cover 15 enable or disable the battery actuation contact means 7 from contact the battery 4 and turn the light source on if a battery 4 is present.

Figure 2:
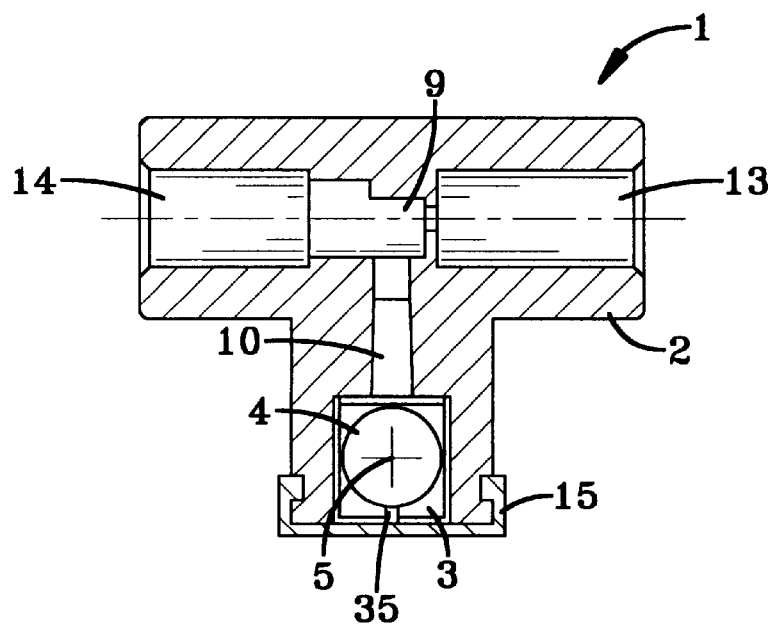
FIG. 2 shows a transverse sectional view of a preferred embodiment the light illumination fixture of FIG. 1, embodying features of the present invention.

Turning now to FIG. 2, a preferred embodiment of the light illuminating fixture 1, is shown in accordance with the present inventive concepts. The light illuminating fixture 1 comprises a bracket 2 containing an opening 3 for a battery 4. The positive contact 5 and the battery actuation contact means 7 disposed within the battery opening 3 is shown. The chamber 9 is connected to the battery contacts through an opening 10 extending from the chamber 9 to the battery opening 3. A plurality of openings 13 and 14 extend from the chamber 9 for receiving a light transmitting material to be illuminated by the light source 8 of FIG. 1. A slideable cover 15 is disposed over the battery opening 3 on the bracket 2 and activator contacts 35 on the slideable cover 15 contact the battery actuation contact means 7 to turn the light source 8 off if a battery 4 is present. When the slideable cover is centered over the battery opening, the activator contacts 35 do not engage the battery activation contact means 7, and the battery actuation contact means 7 contacts the battery 4 and the light source 8 is turned on if a battery 4 is present.

Figure 3:
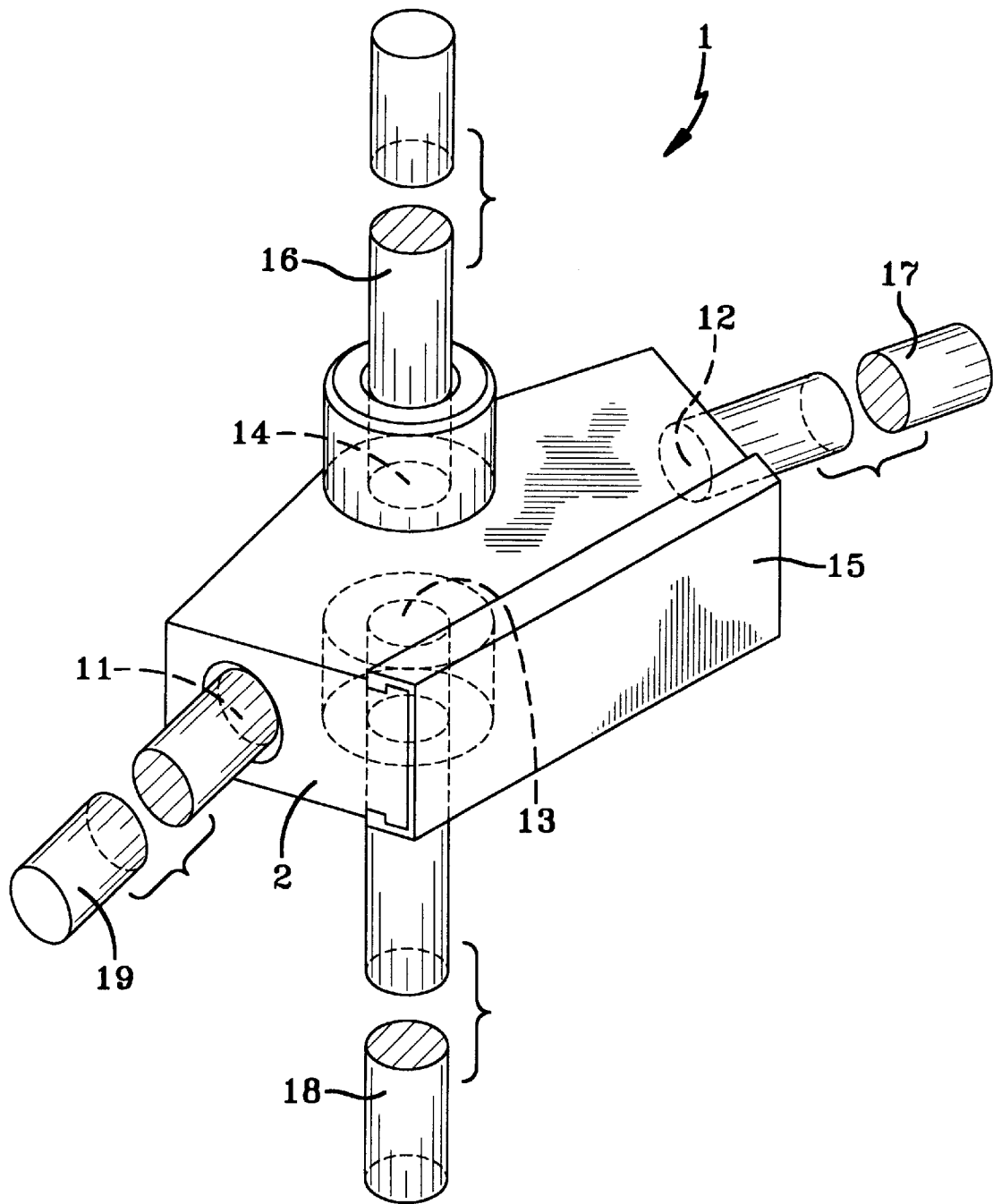
FIG. 3 shows a perspective view of an alternative embodiment of the light illumination fixture with light transmitting material inserted in the openings of the light illumination fixture embodying features of the present invention.

Turning now to FIG. 3, an alternative embodiment of the light illumination fixture of FIGS. 1 and 2, is shown in accordance with the present inventive concepts. The light illumination fixture 1 of FIGS. 1 and 2, is shown in FIG. 3 with a light transmitting material in the form of a semitransparent material in an elongated tubular shape 16, 17, 18, and 19 is shown inserted in the plurality of openings 11, 12, 13 and 14 of the fixture 1. The light transmitting material in the tubular shape 16, 17, 18 and 19 can form part of the support structure of the object to be illuminated. A slideable cover 15 slides on the bracket 2 and is disposed over the battery opening 3 of FIG. 1.

Figure 4:
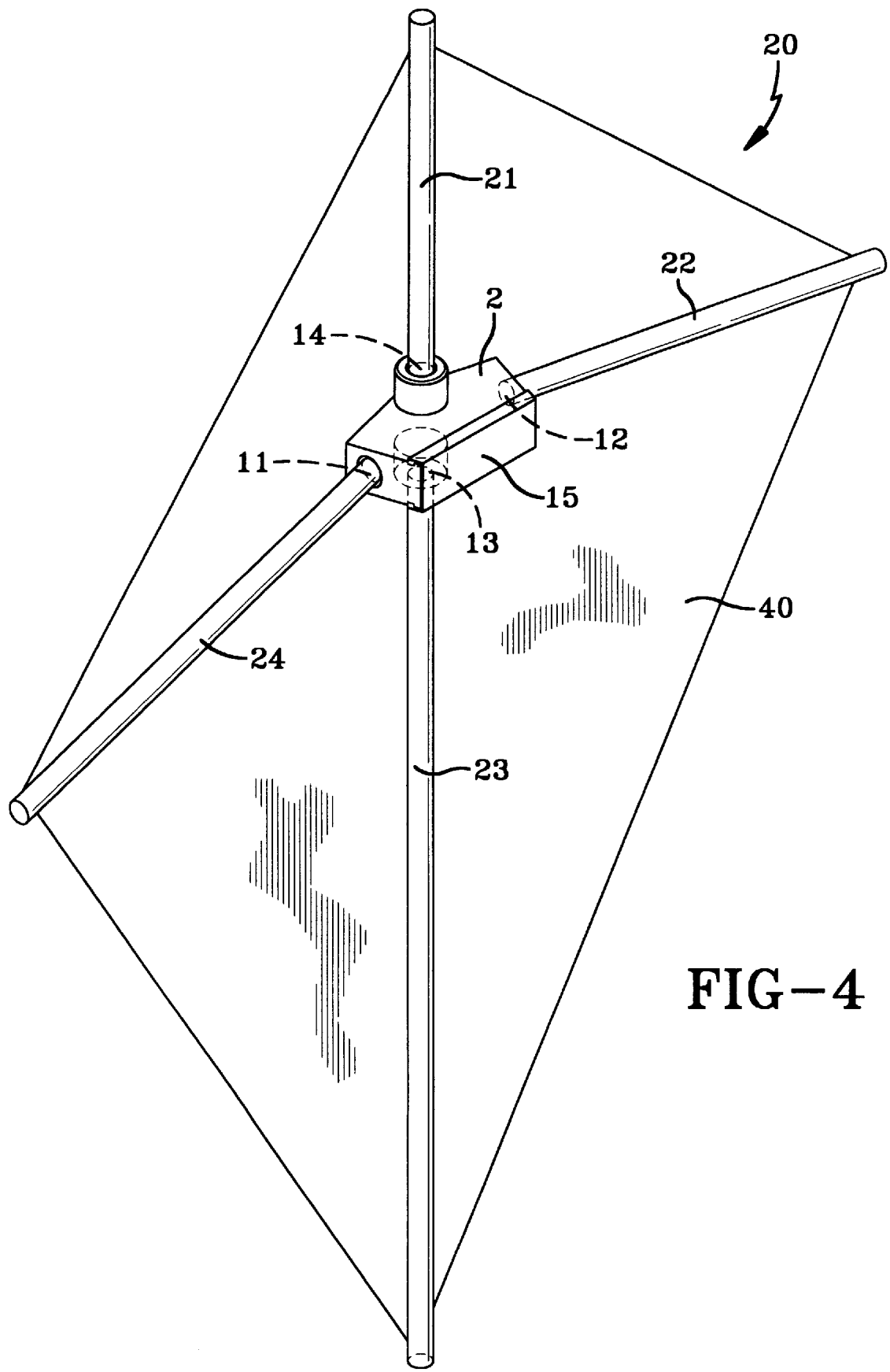
FIG. 4 shows a perspective view of an alternative embodiment of the light illumination fixture illuminating a kite.

Turning now to FIG. 4, an alternative embodiment of an illumination system illuminating a kite is shown in accordance with the present inventive concepts. The kite illumination system 20 comprises the light illumination fixture 1 of FIGS. 1 and 2, together with a light transmitting material in the form of a semitransparent material in an elongated tubular shape 21, 22, 23, and 24 is shown inserted in the plurality of openings 11, 12, 13 and 14 of the fixture 1. The light transmitting material in the tubular shape 21, 22, 23, and 24 is rigidly or loosely secured to the cover sheet of the kite 40 and forms part of the support structure of the kite to be illuminated. A slideable cover 15 slides on the bracket 2 and is disposed over the battery opening 3 of FIG. 1.

Figure 5:
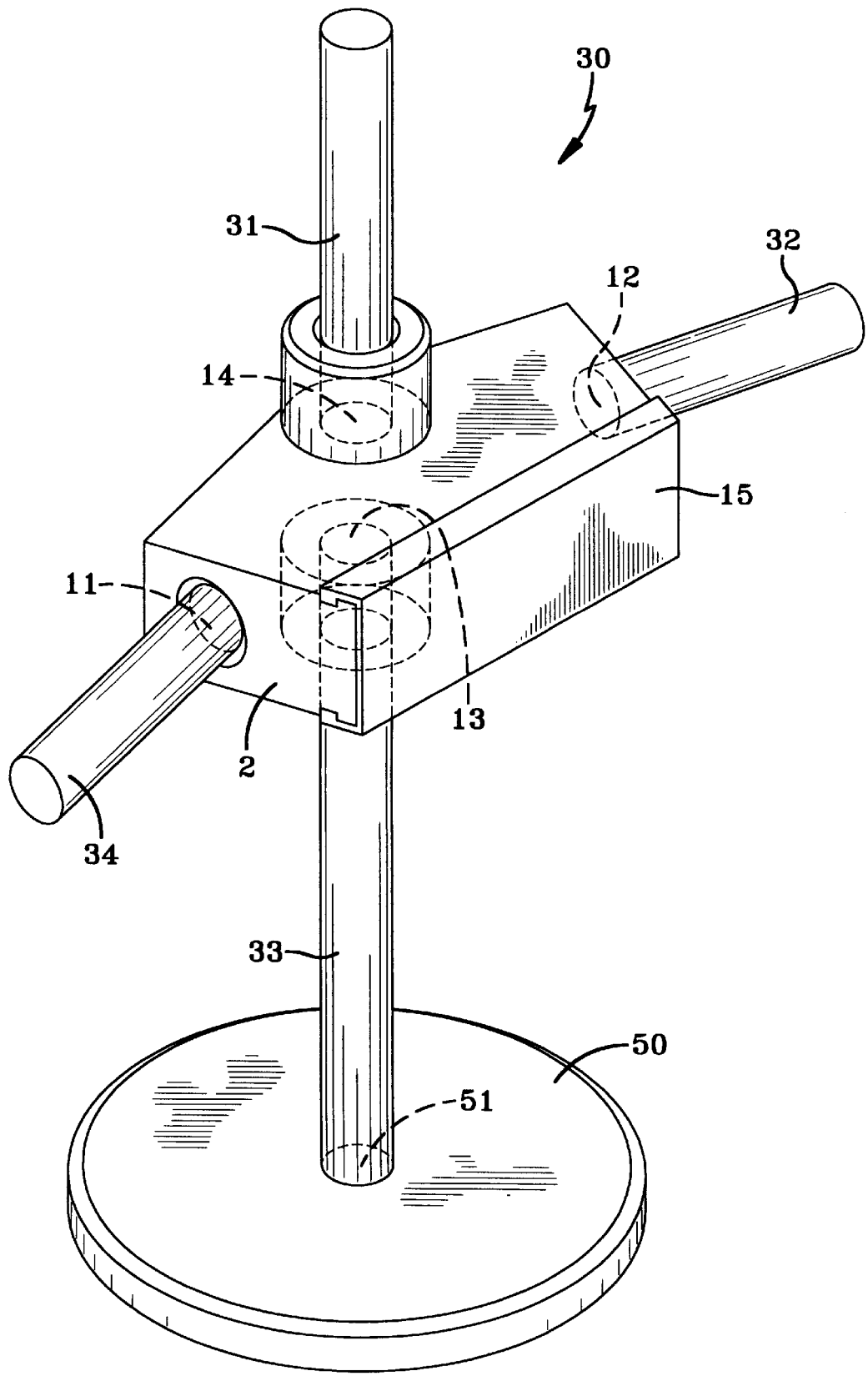
FIG. 5 shows a perspective view of an alternative embodiment of the light illumination fixture illuminating a cross.

Turning now to FIG. 5, an alternative embodiment of an illumination system illuminating a cross is shown in accordance with the present inventive concepts. The cross illumination system 30 comprising the light illumination fixture 1 of FIGS. 1 and 2, together with a light transmitting material, in the form of a semitransparent material in an elongated tubular shape 31, 32, 33 and 34, is shown inserted in the plurality of openings 11, 12, 13 and 14 of the fixture 1. The light transmitting material in the tubular shaped strut 31, 32, 33 and 34 forms part of the support structure of the cross to be illuminated. A slideable cover 15 slides on the bracket 2 and is disposed over the battery opening 3 of FIG. 1. One of the elongated tubular shaped struts 33 may be inserted in a suitably sized opening 51 in a support base 50.

Turning now to FIGS. 1, 2 and 4, to use the fixture to illuminate a kite, a battery 4 is placed in the battery opening 3 properly positioned to actuate the positive and negative contacts 5 and 6. The slideable cover 15 is positioned so as to be centered over the battery opening 3 and activator contacts 35 on the slideable cover 15 to allow the battery actuation contacts means 7 to engage the battery 4 and to allow power to flow to the light source 8 within the chamber 9. Light transmitting material in the form of a semitransparent material forming elongated tubular shaped supports 21, 22, 23 and 24 is inserted into the plurality of openings 11, 12,13 and 14 in the bracket 2. The tubular shapes 21, 22, 23 and 24 are then attached to a kite sheet 40. When the light source 8 is actuated, light is directed through the semitransparent material of the tubular shaped supports 21, 22, 23 and 24 and is visible from some distance away.

Turning now to FIGS. 1, 2 and 5, to use the fixture to illuminate a decorative cross, a battery 4 is placed in the battery opening 3 properly positioned to actuate the positive and negative contacts 5 and 6. The slideable cover 15 is positioned so as to be centered over the battery opening 3 and activator contacts 35 on the slideable cover 15 to allow the battery actuation contacts means 7 to engage the battery 4 and to allow power to flow to the light source 8 within the chamber 9. Light transmitting material in the form of a semitransparent material forming elongated tubular shaped supports 31, 32, 33 and 34 is inserted into the plurality of openings 11, 12, 13 and 14 in the bracket 2. One or more of the tubular shapes 31, 32, 33 and 34 can then be inserted in a suitably sized opening 51 in a support base 50. When the light source 8 is actuated, light is directed through the semitransparent material of the tubular shaped supports 31, 32, 33 and 34 and is visible from some distance away.

Since the illuminating fixture uses only one small light source and makes use of the optical properties of the semitransparent tubular material which may be an acrylic neon, only one low powered light bulb is used that requires only one small battery. Because the illumination fixture is small, composed of a minimum number of pieces, requires only one battery and the light transmitting material forms part of the support structure of the object to be illuminated, it is also lightweight. No special switch is needed and the slideable battery cover acts as a switch. Since the illumination fixture is composed of a minimum number of pieces, it is easy to fabricate and assemble. The chamber design, use of one light source and relying on the optical properties of the semitransparent tubular shaped material, it requires few electrical wires and connections which are safely enclosed within the fixture. The low power, enclosed light source and the lack of exposed wires, reduce the risk of fire and comply with United States Consumer Product Safety Commission Standards.

Although the present invention has been described in considerable detail with reference to certain preferred embodiments thereof, other embodiments are possible. Therefore, the spirit and scope of the appended claims should not be limited to the description of the preferred embodiments herein.

What is claimed is:

1. A light illumination fixture comprising:
   a. a bracket with an opening and contacts for a battery;
   b. a battery actuation contact means disposed within the battery opening;
   c. a light source disposed within a chamber in the bracket and connected to the battery actuation contact means;
   d. a plurality of openings extending from the chamber for receiving a light transmitting material to be illuminated by the light source when a battery is present in the battery opening; and
   e. a removable, slideable cover disposed over the battery opening in the bracket that forms a switch such that when the slideable cover is centered over the battery opening, the battery actuation contact means is actuated by contacting the battery and the light source is turned on if a battery is present, and when the slideable cover is not centered over the battery opening, the battery actuation contact means is not in contact with the battery and the light source is turned off.

2. A kite illumination system comprising:

a. a bracket with an opening for a battery;

b. a battery actuation contact means disposed within the battery opening;

c. a light source disposed within a chamber in the bracket and connected to the battery actuation contact means;

d. a plurality of openings extending from the chamber for receiving a light transmitting material to be illuminated by the light source when a battery is present in the battery opening; and e. a removable, slideable cover disposed over the battery opening in the bracket that forms a switch such that when the slideable cover is centered over the battery opening, the battery actuation contact means is actuated by contacting the battery and the light source is turned on if a battery is present, and when the slideable cover is not centered over the battery opening, the battery actuation contact means is not in contact with the battery and the light source is turned off.

3. A cross illumination system comprising:

a. a bracket with an opening for a battery;

b. a battery actuation means disposed within the battery opening;

c. a light source disposed within a chamber in the bracket and connected to the battery actuation contact;

d. a plurality of openings extending from the chamber for receiving a light transmitting material to be illuminated by the light source when a battery is present in the battery opening;

e. the light transmitting material inserted into the plurality of openings extending form the chamber is in the form of four substantially rigid, elongated tubular shaped support members;

f. the first support member forms the upper central strut of the cross arm and inserted into an opening in the first surface of the bracket;

g. the second support member forms the lower central strut of the cross arm and inserted into an opening directly opposite to the opening in the first surface of the bracket;

h. the third and fourth support members form a strut that bisects the first and second support members wherein the third support member is inserted into a third opening in a third surface of the bracket, which is at a ninety degree angle to the first opening, and a fourth member inserted into a fourth opening in a fourth surface of the bracket, said fourth opening is at a one hundred and eighty degree angle from the third opening; and i. a removable, slideable cover disposed over the battery opening in the bracket that forms a switch such that when the slideable cover is centered over the battery opening, the battery actuation contact means is actuated by contacting the battery and the light source is turned on if a battery is present, and when the slideable cover is not centered over the battery opening, the battery actuation contact means is not in contact with the battery and the light source is turned off.

4. A light illumination fixture, according to claim 2, wherein the light transmitting material is an acrylic transparent or semitransparent optical medium.

5. A light illumination fixture according to claim 2, wherein the light transmitting material is a neon optical medium.

* * * * *